April 10, 1951     G. O. MORRISON ET AL     2,547,962
FORM-STABLE MOLDING COMPOSITION
Filed April 9, 1947
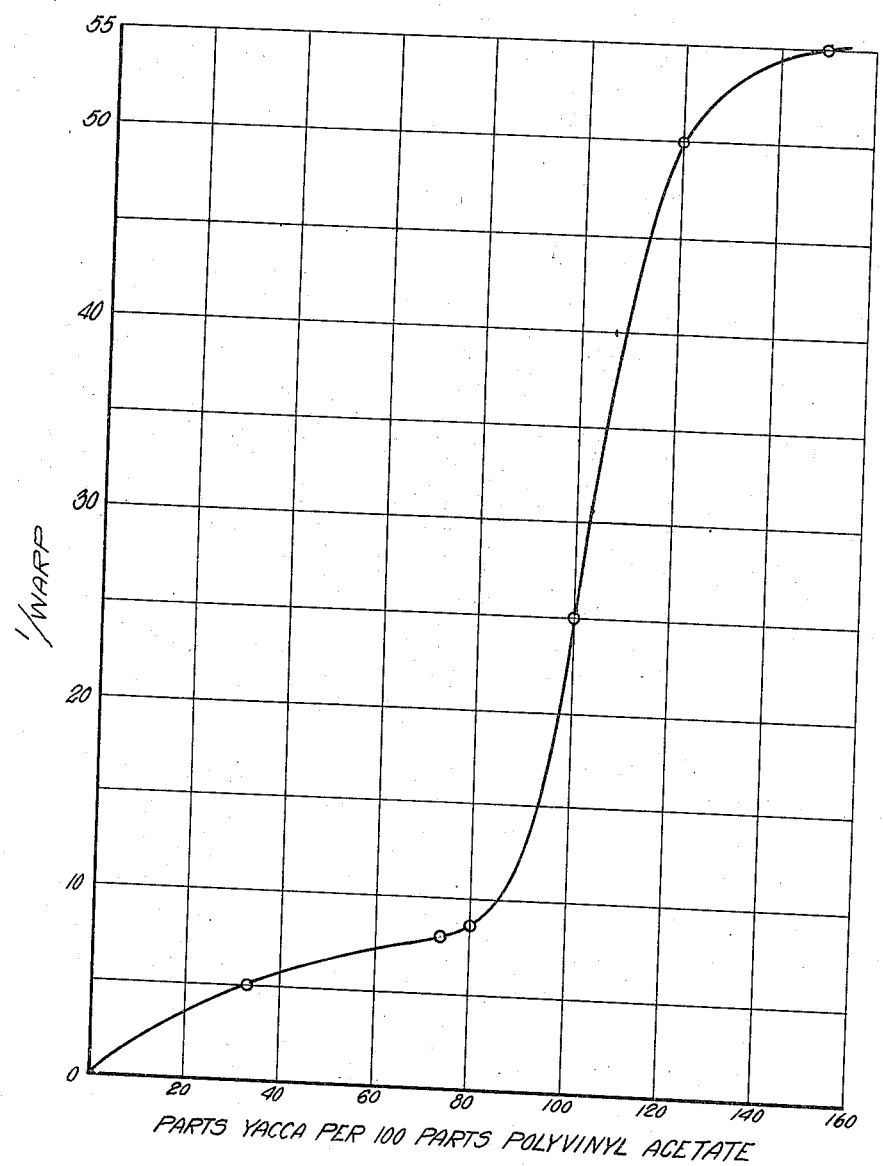
INVENTORS
GEORGE O. MORRISON
GEORGE F. METZ
BY
ATTORNEYS Patented Apr. 10, 1951

2,547,962

UNITED STATES PATENT OFFICE 2,547,962

FORM-STABLE MOLDING COMPOSITION

George O. Morrison, Milltown, N. J., and George F. Metz, Diamond Point, N. Y.

Application April 9, 1947, Serial No. 740,442

15 Claims. (Cl. 260—27)

Our invention relates to thermoplastic compositions which are particularly suitable for the manufacture of phonograph records, but which may be used also for making other pressable or moldable articles.

More specifically, the invention relates to thermoplastic resinous binders and to molding compositions containing the same and characterized by a high degree of warp resistance and form stability, and provides a binder compounded of three major resinous components forming a mutually modifying ternary system in which certain desirable molding and other qualities of each component are retained while undesirable qualities are counteracted or suppressed.

Briefly described, our invention comprises a binder adapted for use with a filler and composed primarily of a ternary resinous system which includes a major proportion of one or more brittle, sharp-melting resins, a minor proportion of a toughening agent in the form of a polyvinyl acetate, and a form-stabilizing resin which is preferably present in an amount at least 100% of that of the polyvinyl acetate.

It is the general object of the present invention to provide a cheap binder for filled molding compositions, and molding compositions containing such binder, such molding compositions being characterized by sufficient strength and resistance to warp to make them suitable for the manufacture of phonograph records, and being characterized also by good sound reproducing qualities, low surface noises and particularly by a capacity for being molded into phonograph records at substantially the same time-temperature cycle as is presently employed in shellac records, so that no material departure from present phonograph record manufacturing practice will be required in its use.

A more specific and further object of the invention is to provide a resinous binder which is composed for the most part of relatively cheap, sharp-melting, and more or less brittle resins which are adequately toughened by being compounded with a minor proportion of a polyvinyl acetate, and to improve the warp-resistance of a filled molding composition prepared with such binder to such a degree that form-stable phonograph records may be manufactured therefrom, by incorporating in the binder also a form-stabilizing agent in quantities sufficient to overcome the rather low warp resistance of the combined polyvinyl acetate and sharp melting resins, but insufficient to cause any undesirable properties of such form-stabilizing agent, such as brittleness and/or lack of fluidity at the desired molding temperature, to dominate the properties of the binder as a whole.

It is a further object of the invention to prepare binder and molding compositions of the type above indicated wherein the polyvinyl acetate is one having a high viscosity, namely, about 40 centipoises and above (measured at 20° C. in a benzene solution containing 86 grams of the resin per liter) and is employed to toughen considerably larger quantities of the sharp-melting resin or resins, the composition being stiffened and rendered resistant to warp and cold flow by the addition thereto of relatively large quantities of natural or purified yacca gum.

Other objects and advantages of the invention will appear from the following more detailed description thereof.

There are available on the market a number of sharp-melting resinous materials, such as the gasoline-insoluble, aromatic hydrocarbon-soluble extract of pine wood resin (of which one form, obtained by extraction from long-leaf yellow pine trees, is sold under the trade-mark "Vinsol" and melts at about 224° F.), coal tar and gashouse pitches (such as the mixture sold under the name "Carbonex" which softens at about 205–220° F. by the ball and ring method in glycerine), pitches obtained by the dry distillation of hard woods (for example, that sold under the name "Demi Gum"), and also resins like hydrogenated rosin and pitches, such as those sold under the names "Staybelite" and "Transphalt-115," which because of their low cost have been employed in a variety of molding compositions. However, these resins are characterized also by a high degree of brittleness, so that their use for the manufacture of articles requiring considerable strength is contraindicated. A further serious defect of resins of the type just described is their lack of form stability, that is their tendency to warping or cold flow at room temperatures or slightly higher temperatures, such defect seemingly ruling these resins out so far as molding compositions in the manufacture of phonograph records are concerned.

In accordance with the present invention the brittleness of sharp-melting resins of the type above indicated is overcome by compounding with such resins a minor proportion of a high molecular weight, that is, a high viscosity polyvinyl acetate. We have found that relatively small amounts of a high viscosity polyvinyl acetate can toughen considerably larger amounts of the brittle, sharp-melting resins, thereby yielding relatively cheap molding compositions characterized by adequate strength for use in the manufacture of sound recording discs and the like. However, the use of polyvinyl acetate resins for toughening brittle, sharp-melting resins accentuates a problem that is not encountered when polyvinyl acetal resins are used, and that is the matter of form-stability at normal room and also the somewhat higher temperatures (say about 105°) to which phonograph records are subjected in storage and use. Whereas polyvinyl acetal resins have sufficient excess rigidity or form-stability to overcome the lack of form-stability of even larger amounts of brittle, sharp-melting resins compounded therewith, this is not true of polyvinyl acetate resins. While polyvinyl acetates are capable of overcoming the brittleness of the sharp-melting resins, they do not act, as do certain polyvinyl acetal resins, such as polyvinyl formal resins, to overcome also the form-instability of the sharp-melting resins, but may be said instead to aggravate the problem of form-instability because they are themselves not form-stable resins from the standpoint of phonograph record manufacture. This has presented a serious problem because although the mixture of polyvinyl acetate and sharp-melting resin is satisfactory from the standpoint of strength, it is deficient from the standpoint of form-stability to such a degree that from the teaching of the prior art it appears that such large quantities of a form-stabilizing agent would be needed to make all of the properties of such form-stabilizing agent largely dominant in the mixture as a whole. This was undesirable because no form-stabilizing agent is known all of whose properties, aside from its form-stabilizing characteristics, meet the requirements of the special molding conditions employed in the manufacture of phonograph records. It seemed, therefore, that a mixture of a cheap, sharp-melting resin with a polyvinyl acetate was impracticable for the manufacture of non-warping, thin flat stock as it would require such large quantities of a form-stabilizing ingredient that the desirable molding properties of such mixture of sharp-melting resin and a polyvinyl acetate would be eclipsed by the undesirable or less desirable molding properties of the form-stabilizing ingredient.

A known form-stabilizing agent for polyvinyl acetate is a resin known as yacca gum, the same being also sometimes called gum acaroid or "Black Boy" gum or Botany Bay gum or earth shellac. This gum is of vegetable origin and is obtained as exudations from plants of the species Xanthorrhoea (hastilis, Australia, etc.) belonging to the order Asphodeleae. From the known degree of form-stabilizing action of this gum it appeared, from the circumstances set forth, that such large quantities thereof would be necessary to stiffen a mixture of a major proportion of a sharp-melting brittle resin and a minor proportion of a polyvinyl acetate that its embrittling effect would undo at least in part the toughening action of the polyvinyl acetate on the sharp-melting resin. An additional factor which apparently militated against the use of yacca gum in quantities sufficient for the purposes above set out was the relatively high melting point of yacca gum (260° F.—ball and ring method), which would make the ternary mixture incapable of use in the time-temperature cycle presently employed in the manufacture of shellac records, as it would lack the necessary free-flowing properties.

We have found that while the stiffening action of yacca gum can be said to follow a straight line function in the proportions of such gum heretofore employed with polyvinyl acetates, the form-stabilizing action increases unexpectedly very considerably above the straight line function values once the proportion of the gum to the polyvinyl acetate is increased beyond a certain more or less critical value. By this we mean that whereas in the lower ranges of the proportion of yacca to polyvinyl acetate, the stiffening effect of the yacca is more or less directly proportional to the amount of yacca employed, when the proportion of yacca to the polyvinyl acetate is above such critical value, the rate of increase of the stiffening action per additional unit of yacca gum rises very sharply. In consequence, a very large increase in the stiffening action is obtained for a relatively small increase in the amount of yacca. As a result, the needed total form-stabilizing effect for the mixture of sharp-melting resin and polyvinyl acetate can be secured with much less than the expected quantity of yacca gum, so that the undesirable properties of the yacca gum, that is, its embrittling action and its tendency to raise the molding temperatures, do not become a major influence on the properties of the molding composition as a whole.

The present invention accordingly provides molding compositions, and binders for molding compositions, wherein the major component is a sharp-melting brittle resin, a minor component being a polyvinyl acetate resin, such resins being compounded with a quantity of yacca gum which is above 80%, and preferably at least 100%, of the quantity of the polyvinyl acetate. Above such minimum critical ratio of 80 parts to 100 parts of polyvinyl acetate, the rate of increase in warp-resistance, as we have found, is so rapid as to dwarf or minimize the increase in embrittlement due to the yacca. Thus the warp resistance rises with increase of the yacca content from 33.3% to 66.7% (based on the Gelva content) from about 5 to only about 8 (that is, on doubling of the yacca content); but from 80% to 100% yacca content (an increase of only one-fourth), the warp resistance increases from about 8.3 to 25, which is a three-fold increase; and increase of the yacca content from 100% to 120% doubles the warp resistance as shown in the table below. This greatly improved warp resistance makes our composition especially suitable for phonograph records.

The yacca gum can be either crude or refined and is used in quantities sufficient to produce the necessary form-stabilizing action, excessive quantities being undesirable because of its own undesirable properties as explained above. We have found that cheap and highly satisfactory binders can be obtained by the use of polyvinyl acetates of relatively high viscosities, that is, viscosities above 40 centipoises and preferably as high as 60 and above. A satisfactory viscosity range is from 60 to 150 centipoises although polyvinyl acetates of higher viscosities can be used. The sharp-melting resins can be used individually, or mixtures of such resins can be and preferably are employed.

In carrying out the present invention, therefore, we preferably employ at least about 80 parts of yacca gum to 100 parts of polyvinyl acetate resin, such as that sold under the trade-mark "Gelva," and employ in the mixture a quantity of cheap, sharp-melting resins in excess of the polyvinyl acetate resin, such sharp-melting resins being present in an amount at least twice and as much as four or more times the polyvinyl acetate resin. The exact proportions will depend upon the molding temperatures employed and the desired time cycle, and upon the specific properties desired in the molded article.

The sharp-melting resins employed by us have a melting point range of about 195° to 250° F. (ball and ring method, A. S. T. M. E28-42T), a maximum melting point of 240° F. being preferred for phonograph record molding compositions. These resins impart fluidity to the molding composition at the molding temperatures, in contrast to the tough polyvinyl acetate resins, which have a low degree of fluidity and would otherwise be incapable of being molded at temperatures commonly employed in phonograph record manufacture. Our molding composition preferably contains also relatively small proportions of waxes like carnauba and ceranova, and also a parting agent like stearic acid or various metal stearates, like lead and calcium stearates. A pigment like carbon black may likewise be included, and, if desired, a plasticizer may also be added in small amounts. The filler preferably constitutes at least 50 per cent of the whole molding composition. Suitable fillers include "Lesomite" (calcium carbonate), slate, clay, diatomaceous earths like "Superfloss," "Diccalite," and "Celite," and other known fillers, like "Keystone" (calcium carbonate) filler, whiting, flock, etc., and mixtures thereof. The fillers are preferably employed in finely ground condition so that the phonograph record surface will give a minimum of scratch noises. As much as 125 parts of yacca to 100 parts of polyvinyl acetate improve the form-stability of the molding composition without seriously affecting its toughness or strength.

On the attached drawing is shown a graph presenting a curve illustrating the increase of the form-stabilizing effect obtained with increasing quantities of a yacca gum in relation to the polyvinyl acetate. The ordinates represent the inverse of the warp $$\left(\frac{1}{warp}\right)$$

i. e., the resistance to warp, while the ordinates represent the quantity of yacca per 100 grams of polyvinyl acetate (Gelva V60). The following found values of yacca and warp are plotted:

| Polyvinyl Acetate | Yacca | Warp | 1 warp |
|---|---|---|---|
| 100 | 33.3 | .261 |  |
| 100 | 66.7 | .125 | 5 |
| 100 | 80 | .120 | 8 |
| 100 | 100 | .039 | 8.3 |
| 100 | 120 | .020 | 25 |
| 100 | 150 | .018 | 50 |
|  |  |  | 55 |

It will be seen that up to a ratio of approximately 80 parts of yacca to 100 parts of polyvinyl acetate (the selected resin being one having a viscosity of 60 centipoises) the increase in the warp resistance follows a more or less straight line function. Beyond that point, however, the curve rises steeply and the rate of increase of warp resistance per unit increase of yacca is far greater than in advance of the more or less critical ratio of approximately 80 per cent.

For pressing a phonograph record, the following formulae, which are presented by way of illustration only, have been found by us to yield a pressed disc of highly satisfactory properties:

Example 1

| | Parts by weight |
|---|---|
| Gelva V60 | 9 |
| Yacca | 9 |
| Vinsol | 12 |
| Carbonex | 12 |
| Lead stearate | 1.5 |
| Ceranova wax | .7 |
| Carbon black | 2 |
| Celite | 6.5 |
| 1019 filler | 47.3 |

This composition can be pressed in practically the same time-temperature cycle as a shellac record biscuit, and yields a phonograph record superior in practically all respects to the conventional shellac record. Thus it has greater strength and impact resistance, is highly resistant to needle wear, gives a highly faithful reproduction of the master record, and has reduced needle scratch noises. The warp characteristics of the record are highly satisfactory. Increasing the yacca-Gelva ratio from 1:1 to 11:9 gives still better warp characteristics, in higher degree than a corresponding change of yacca to Gelva in the low ranges; however, the proportion of yacca should not be increased too much as then the pressing and strength characteristics are unfavorably affected.

The materials are compounded in any suitable manner known to the art, as by first fusing together the resinous materials, followed by addition of the waxy material and parting agent, this being done in any suitable heating, mixing or compounding apparatus. Thereafter the pigment and fillers are added, and the mixing continued until a uniform mass is obtained.

The proportion of Gelva can vary from about 15 per cent to about 30 per cent of the total binder, the preferred range being from about 17 to 27 per cent of the binder.

In the above example the ratio of Gelva to yacca is 1:1; while the ratio of Gelva to sharp-melting resin is 1:2.67.

| | Examples | | | | |
|---|---|---|---|---|---|
| | 2 | 3 | 4 | 5 | 6 |
| Gelva V60 | 6 | 6 | 6 | 6 | 8 |
| Yacca | 6 | 6 | 6 | 6 | 10 |
| Vinsol |  | 5 |  | 6 | 13 |
| Demi Gum |  |  |  | 5 |  |
| Carbonex | 10 | 5 | 10 | 8 |  |
| Transphalt 115 | 10.2 | 10 |  | 10 | 11 |
| Staybelite |  |  | 10 |  |  |
| Pb Stearate | 3.7 | 5 | 5 | 5 |  |
| Ceranova Wax | 1.2 | 1.2 | 1.2 | 1.2 | 2 |
| Carbon Black | .5 | .5 | .5 | .5 | .5 |
| Filler 1019 | 1.5 | 1.5 | 1.5 | 1.5 | 2 |
| Keystone Filler | 55.9 | 55 | 30 |  | 47 |
| Slate |  |  | 25 |  |  |
| Whiting |  |  |  | 28 |  |
| Flock |  |  |  | 28 |  |
| Celite | 5.0 | 4.8 | 4.8 | 8.8 | 6.5 |
| Gelva/Yacca | 1/1 | 1/1 | 1/1 | 1/1 | 1.125 |
| Gelva-Sharp-melting Resin | 1/4 | 1/4.2 | 1/4.2 | 1/4.67 | 1/3 |

The filler in the above example includes Celite which is a diatomaceous earth, and a red clay filler known as 1019. The Celite represents a high oil-absorption filler, but can be replaced by a low oil-absorption filler such as the 1019 filler if the difference in oil absorption is compensated for in other ways.

We claim:

1. A molding composition suitable for the manufacture of phonograph records and characterized by a high degree of form-stability and comprising a binder component and a filler component, the binder component comprising a brittle, sharp-melting resin, the sharp-melting resin being present in a larger proportion than the polyvinyl acetate, a polyvinyl acetate resin, and a quantity of yacca gum equal to at least about 80 parts by weight per 100 parts of the polyvinyl acetate, the polyvinyl acetate having a viscosity of at least 40 centipoises when measured at 20° C. in a benzene solution containing 86 grams of the resin per liter.

2. A molding composition as defined in claim 1, wherein the brittle, sharp-melting resin is the gasoline-insoluble, aromatic hydrocarbon-soluble extract of pine wood resin.

3. A molding composition as defined in claim 1, wherein the polyvinyl acetate has a viscosity of at least 60 centipoises when measured at 20° C. in a benzene solution containing 86 grams of the resin per liter.

4. A molding composition as defined in claim 1, wherein the brittle, sharp-melting resin comprises the gasoline-insoluble, aromatic hydrocarbon-soluble extract of pine wood resin, and a coal tar and gas-house pitch which softens at about 205–220° F., in approximately equal amounts.

5. A molding composition suitable for the manufacture of phonograph records and characterized by a high degree of form-stability and composed of approximately 9 parts of a tough polyvinyl acetate resin having a viscosity of approximately 60 centipoises when measured at 20° C. in a benzene solution containing 86 grams of the resin per liter, 9 parts of yacca gum, 12 parts of the gasoline-insoluble, aromatic hydrocarbon-soluble extract of pine wood resin, and 12 parts of a pitch having a softening point of about 205–220° F.

6. A molding composition suitable for the manufacture of phonograph records and characterized by a high degree of form-stability at temperatures of about 40° C. and composed of approximately 9 parts of a polyvinyl acetate resin having a viscosity of approximately 60 centipoises when measured at 20° C. in a benzene solution containing 86 grams of the resin per liter, 9 parts of yacca gum, and 24 parts of sharp-melting resin.

7. A molding composition as defined in claim 6, wherein the composition includes a filler in an amount in excess of the combined weights of the polyvinyl acetate resin, yacca gum, and sharp-melting resin.

8. A molding composition as defined in claim 1, wherein the filler includes a diatomaceous earth and a clay.

9. A resinous binder composed of a brittle, sharp-melting resinous material, a polyvinyl acetate resin in smaller proportion than the sharp-melting resinous material but in quantities sufficient to toughen the sharp-melting resin, and a quantity of yacca gum equal to at least about 80 parts by weight per 100 parts of the polyvinyl acetate, the latter having a viscosity of at least 40 centipoises when measured at 20° C. in a benzene solution containing 86 grams of the resin per liter.

10. A binder as defined in claim 9, wherein the sharp-melting resin melts between approximately 195° and 240° F.

11. A binder as defined in claim 9, wherein the polyvinyl acetate has a viscosity of at least about 60 centipoises when measured at 20° C. in a benzene solution containing 86 grams of the resin per liter.

12. A binder as defined in claim 9, wherein the sharp-melting resin includes the gasoline-insoluble, aromatic hydrocarbon-soluble extract of pine wood resin.

13. A binder as defined in claim 9, wherein the quantity of sharp-melting resin material is from about two to about five times that of the polyvinyl acetate resin.

14. A resinous binder comprising relatively brittle, sharp-melting resin material, a polyvinyl acetate resin having a viscosity of at least 60 centipoises at 20° C. in a benzene solution containing 86 grams of the resin per liter, and yacca gum, the ratio of yacca to polyvinyl acetate ranging from 1 to about 1.25, and the amount of sharp-melting resin material ranging from about 2.67 to about 4.67 times that of the polyvinyl acetate.

15. A resinous binder suitable for admixture with a filler for the manufacture of phonograph records, comprising a brittle, sharp-melting resin having a melting point of about 195 to 240° F. a quantity of a polyvinyl acetate having a viscosity of at least 40 centipoises at 20° C. in a benzene solution containing 86 grams of the resin per liter, which quantity is less than the quantity of the sharp-melting resin, and a quantity of yacca gum in excess of the quantity of polyvinyl acetate to form-stabilize the binder, so that when the binder is mixed with a filler a phonograph disc pressed therefrom will be resistant to warping at about 40° C.

GEORGE O. MORRISON.
GEORGE F. METZ.

REFERENCES CITED

The following references are of record in the file of this patent:

UNITED STATES PATENTS

| Number | Name | Date |
|---|---|---|
| 2,127,381 | Herrmann et al. | Aug. 16, 1938 |
| 2,130,239 | Hunter | Sept. 13, 1938 |

FOREIGN PATENTS

| Number | Country | Date |
|---|---|---|
| 414,703 | Great Britain | Aug. 8, 1934 |